(12) United States Patent
Barot et al.

(10) Patent No.: US 9,690,494 B2
(45) Date of Patent: Jun. 27, 2017

(54) MANAGING CONCURRENT ACCESS TO MULTIPLE STORAGE BANK DOMAINS BY MULTIPLE INTERFACES

(71) Applicant: QUALCOMM Incorporated, San Diego, CA (US)

(72) Inventors: Nitinkumar Barot, San Jose, CA (US); Yifan Li, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 99 days.

(21) Appl. No.: 14/805,185

(22) Filed: Jul. 21, 2015

(65) Prior Publication Data

US 2017/0024143 A1    Jan. 26, 2017

(51) Int. Cl.
| | |
|---|---|
| G06F 12/00 | (2006.01) |
| G06F 3/06 | (2006.01) |
| G06F 12/02 | (2006.01) |
| G06F 12/06 | (2006.01) |
| G06F 13/16 | (2006.01) |
| G06F 9/50 | (2006.01) |

(52) U.S. Cl.
CPC .......... *G06F 3/0611* (2013.01); *G06F 3/0644* (2013.01); *G06F 3/0685* (2013.01); *G06F 12/023* (2013.01); *G06F 12/0623* (2013.01); *G06F 13/16* (2013.01); *G06F 9/50* (2013.01); *G06F 12/00* (2013.01); *G06F 12/02* (2013.01)

(58) Field of Classification Search
CPC .... G06F 3/0611; G06F 12/023; G06F 3/0644; G06F 12/0623; G06F 3/0685; G06F 12/00; G06F 13/16; G06F 15/17381; G06F 3/06535; G06F 9/50; G06F 12/02

USPC .................... 711/154, 153; 710/38
See application file for complete search history.

(56) References Cited

U.S. PATENT DOCUMENTS

| | | |
|---|---|---|
| 6,853,382 B1 | 2/2005 | Van Dyke et al. |
| 7,515,453 B2 | 4/2009 | Rajan |
| 7,882,327 B2 | 2/2011 | Kalyanasundharam et al. |
| 8,644,104 B2 | 2/2014 | Perego |
| 8,804,394 B2 | 8/2014 | Ware et al. |
| 2007/0150668 A1 | 6/2007 | Kwon et al. |

(Continued)

OTHER PUBLICATIONS

International Search Report and Written Opinion—PCT/US2016/039665—ISA/EPO—Sep. 29, 2016.

*Primary Examiner* — Hong Kim
(74) *Attorney, Agent, or Firm* — Loza & Loza, LLP

(57) ABSTRACT

System, methods and apparatus are described that facilitate access to a memory device. A memory space within the memory device is divided into a plurality of storage bank domains. Thereafter, application interface circuits configured to access the memory space are classified into a plurality of interface groups based on one or more application usage requirements. Each interface group of the plurality of interface groups is assigned to a corresponding storage bank domain from the plurality of storage bank domains. Access between each interface group and the corresponding storage bank domain is then provided, wherein a first application interface circuit of a first interface group accesses a first corresponding storage bank domain while a second application interface circuit of a second interface group accesses a second corresponding storage bank domain.

24 Claims, 12 Drawing Sheets

(56) References Cited

U.S. PATENT DOCUMENTS

| | | | |
|---|---|---|---|
| 2010/0228949 A1* | 9/2010 | Anderson | G06F 15/825 |
| | | | 5/825 |
| 2011/0173415 A1* | 7/2011 | Tanabe | G06F 12/084 |
| | | | 712/29 |
| 2012/0185633 A1* | 7/2012 | Sano | G06F 15/17381 |
| | | | 710/316 |
| 2014/0047251 A1 | 2/2014 | Kottilingal et al. | |
| 2014/0181428 A1* | 6/2014 | Hsu | G06F 12/00 |
| | | | 711/154 |
| 2015/0036416 A1* | 2/2015 | Kim | G11C 5/14 |
| | | | 365/149 |
| 2016/0034195 A1* | 2/2016 | Li | G06F 13/382 |
| | | | 711/117 |
| 2016/0269320 A1* | 9/2016 | Uchibori | H04L 49/109 |
| 2017/0024143 A1* | 1/2017 | Barot | G06F 3/0611 |

\* cited by examiner

MANAGING CONCURRENT ACCESS TO MULTIPLE STORAGE BANK DOMAINS BY MULTIPLE INTERFACES

BACKGROUND

Field

The present disclosure relates generally to information storage devices, and more particularly, to facilitating concurrent access to storage domains of the information storage devices by multiple application interface circuits.

Background

Cellular and wireless communication technologies have seen explosive growth over the past several years. Wireless service providers now offer a wide array of features and services, and provide their users with unprecedented levels of access to information, resources and communications. To keep pace with these service enhancements, mobile electronic devices (e.g., cellular phones, tablets, laptops, etc.) have become more feature rich and complex than ever. Mobile electronic devices now commonly include multiple processors, system-on-chips (SoCs), multiple memories, and other resources (e.g., power rails, etc.) that allow mobile device users to execute complex and power intensive software applications (e.g., video streaming, multimedia processing, etc.) on their mobile devices. As mobile devices and related technologies continue to grow in popularity and use, improving the performance capabilities and power consumption characteristics of mobile devices are expected to become important and challenging design criteria for mobile device designers.

SUMMARY

Embodiments disclosed herein provide systems, methods and apparatus for accessing a memory device.

In an aspect of the disclosure, a method for accessing a memory device includes dividing a memory space within the memory device into a plurality of storage bank domains, classifying application interface circuits configured to access the memory space into a plurality of interface groups based on one or more application usage requirements, assigning each interface group of the plurality of interface groups to a corresponding storage bank domain from the plurality of storage bank domains, and providing access between each interface group and the corresponding storage bank domain. A first application interface circuit of a first interface group accesses a first corresponding storage bank domain while a second application interface circuit of a second interface group accesses a second corresponding storage bank domain. The storage bank domains may be separately power-controlled.

The one or more application usage requirements may include at least one of an application storage size requirement, an application interface bandwidth requirement, or an application interface latency requirement. The access may be provided by a plurality of routers managing concurrent data flow between the plurality of interface groups and the storage bank domains. The plurality of routers may be located between the application interface circuits and the plurality of storage bank domains. Each router of the plurality of routers may be located adjacent to a corresponding set of storage banks that includes storage banks of different storage bank domains. According to certain aspects, the method for accessing the memory device may further include sending data having a low-latency requirement from an application interface circuit of an interface group to a storage bank of a corresponding storage bank domain via a router providing lowest-latency access to the storage bank.

In an aspect of the disclosure, an apparatus for accessing a memory device includes means for dividing a memory space within the memory device into a plurality of storage bank domains, means for classifying application interface circuits configured to access the memory space into a plurality of interface groups based on one or more application usage requirements, means for assigning each interface group of the plurality of interface groups to a corresponding storage bank domain from the plurality of storage bank domains, and means for providing access between each interface group and the corresponding storage bank domain. A first application interface circuit of a first interface group accesses a first corresponding storage bank domain while a second application interface circuit of a second interface group accesses a second corresponding storage bank domain. According to certain aspects, the apparatus for accessing the memory device may further include means for sending data having a low-latency requirement from an application interface circuit of an interface group to a storage bank of a corresponding storage bank domain via a router providing lowest-latency access to the storage bank and means for separately power-controlling the storage bank domains.

In an aspect of the disclosure, an apparatus for accessing a memory device includes at least one processor configured to divide a memory space within the memory device into a plurality of storage bank domains, classify application interface circuits configured to access the memory space into a plurality of interface groups based on one or more application usage requirements, assign each interface group of the plurality of interface groups to a corresponding storage bank domain from the plurality of storage bank domains, and provide access between each interface group and the corresponding storage bank domain. A first application interface circuit of a first interface group accesses a first corresponding storage bank domain while a second application interface circuit of a second interface group accesses a second corresponding storage bank domain.

In an aspect of the disclosure, a processor-readable storage medium having one or more instructions which, when executed by at least one processing circuit, cause the at least one processing circuit to divide a memory space within a memory device into a plurality of storage bank domains, classify application interface circuits configured to access the memory space into a plurality of interface groups based on one or more application usage requirements, assign each interface group of the plurality of interface groups to a corresponding storage bank domain from the plurality of storage bank domains, and provide access between each interface group and the corresponding storage bank domain. A first application interface circuit of a first interface group accesses a first corresponding storage bank domain while a second application interface circuit of a second interface group accesses a second corresponding storage bank domain.

DETAILED DESCRIPTION

Figure 1:
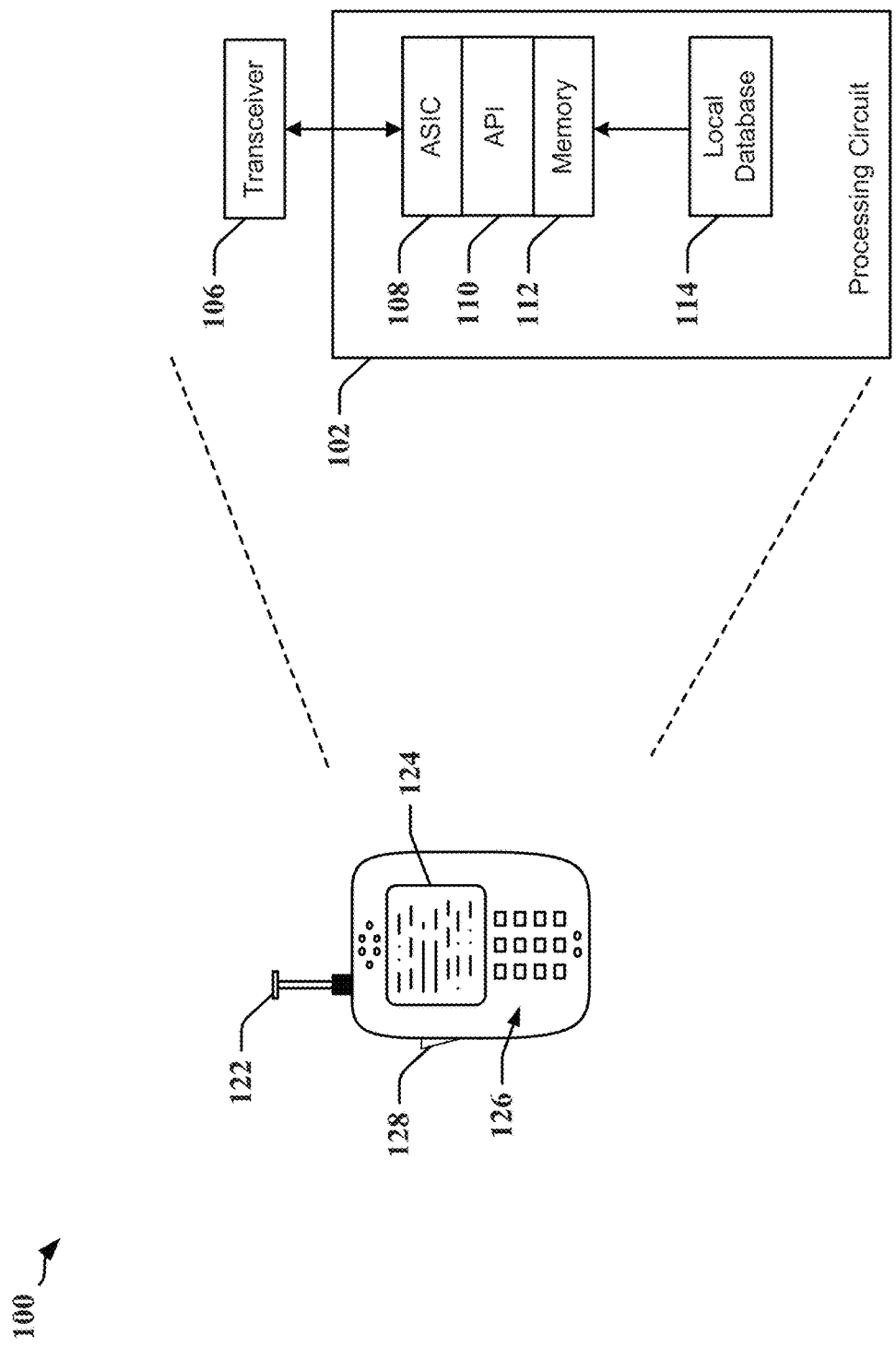
FIG. 1 depicts an apparatus including a processing circuit that is configured to control operation of the apparatus.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as, but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computing device and/or distributed between two or more computing devices. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The terms "computing device" and "mobile device" are used interchangeably herein to refer to any one or all of servers, personal computers, smartphones, cellular telephones, tablet computers, laptop computers, netbooks, ultra-books, palm-top computers, personal data assistants (PDAs), wireless electronic mail receivers, multimedia Internet enabled cellular telephones, Global Positioning System (GPS) receivers, wireless gaming controllers, and similar personal electronic devices which include a programmable processor. While the various aspects are particularly useful in mobile devices (e.g., smartphones, laptop computers, etc.), which have limited resources (e.g., processing power, battery, etc.), the aspects are generally useful in any computing device that may benefit from improved processor performance and reduced energy consumption.

The term "multicore processor" is used herein to refer to a single integrated circuit (IC) chip or chip package that contains two or more independent processing units or cores (e.g., central processing unit (CPU) cores, etc.) configured to read and execute program instructions. The term "multiprocessor" is used herein to refer to a system or device that includes two or more processing units configured to read and execute program instructions.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.), any or all of which may be included in one or more cores.

A number of different types of memories and memory technologies are available or contemplated in the future, all of which are suitable for use with the various aspects. Such memory technologies/types include phase change random access memory (PRAM), dynamic random access memory (DRAM), static random access memory (SRAM), non-volatile random access memory (NV RAM), pseudostatic random access memory (PSRAM), double data rate (DDR) synchronous dynamic random access memory (SDRAM), and other random access memory (RAM) and read-only memory (ROM) technologies known in the art. A DDR SDRAM memory may be a DDR type 1 SDRAM memory, DDR type2 SDRAM memory, DDR type 3 SDRAM memory, or a DDR type 4 SDRAM memory. Each of the above-mentioned memory technologies include, for example, elements suitable for storing instructions, programs, control signals, and/or data for use in or by a computer or other digital electronic device. Any references to terminology and/or technical details related to an individual type of memory, interface, standard or memory technology are for illustrative purposes only, and not intended to limit the scope of the claims to a particular memory system or technology unless specifically recited in the claim language.

In recent years, mobile computing device architectures have grown in complexity, and now commonly include multiple processor cores, system-on-chips (SOCs), co-processors, functional modules including dedicated processors (e.g., communication modem chips, GPS receivers, etc.), complex memory systems, intricate electrical interconnections (e.g., buses and/or fabrics), and numerous other resources that execute complex and power intensive software applications (e.g., video streaming applications, etc.). With this rise in complexity, new memory management solutions are required to improve the computational and power management performance of mobile devices.

Current devices utilize many different communications protocols (including machine-to-machine and machine-to-human protocols), and therefore need a high degree of parallelism, i.e., the ability for the different communications protocols to concurrently access a memory space via multiple avenues. This requires unblocked interaction and/or data transport between the several communications protocols. A majority of the data is stored in dedicated storage chips (e.g., DRAM, flash, etc.). Due to the nature of separate chips, the data is accessed via interfaces, designed to interoperate among several functional chips. Due to a high degree of concurrent access requirements, an interface is often bottlenecked, and is constantly revised (e.g., DDR, DDR2, DDR3, DDR4, LP DDR, eMMC, Serial Flash, and RAMBUS).

Certain aspects of the disclosure are directed to storage organization that allows for a high degree of freedom for interfacing and access streamlining multi-protocol communication devices. In an aspect, an interfacing strategy is manipulated to expose an internal multitude of degrees of freedom, inherent in a storage function, beyond an "implementation boundary." This allows for higher concurrency at lower costs, in terms of power, and aggregated platform implementation. Hence, more functions may be performed for less joules total.

The storage organization may be quantized in three dimensions to serve the needs of communications IC. An aspect may include interface access parallelism per pin, per unit wait time. For example, multiple interfaces may concurrently access portions of a memory (access domains) in parallel. The access may be based on interface usage requirements, such as a memory size requirement, a bandwidth requirement, and/or a latency requirement. Another aspect may include power segmentation. For example, access domains may be separately power-controlled to allow for multiple sub-regulated domains that are dynamically optimized for a prevailing case being used at the moment as dictated by a device application.

The storage organization may further provide for spatially mapped pseudo cache implementations with aggregated storage banks in shared power domains, and interface bundles; routers (micro-routers), which are fast switch networks that allow the isolation necessary to support concurrent memory access and path finding to allow for reach to any word of storage cells, to trade off locality of reference and latency; and multiple interface ports to allow for concurrent and contention free access to in-place computation.

Certain aspects of the invention may be applicable to communications links deployed between electronic components, which may include subcomponents of devices such as telephones, mobile computing devices, appliances, automobile electronics, avionics systems, etc. Referring to FIG. 1, for example, an apparatus 100 may include a processing circuit 102 that is configured to control operation of the apparatus 100. The processing circuit 102 may access and execute software applications and control logic circuits and other devices within the apparatus 100. In one example, the apparatus 100 may include a wireless communication device that communicates through a radio frequency (RF) communications transceiver 106 with a radio access network (RAN), a core access network, the Internet and/or another network. The RF communications transceiver 106 may be operably coupled to a processing circuit 102. The processing circuit 102 may include one or more IC devices, such as an application specific integrated circuit (ASIC) 108. The ASIC 108 may include one or more processing devices, logic circuits, and so on. The processing circuit 102 may include and/or be coupled to processor readable storage 112 that may maintain instructions and data that may be executed by the processing circuit 102. The processing circuit 102 may be controlled by one or more of an operating system and an application programming interface (API) 110 layer that supports and enables execution of software modules residing in the storage 112 of the wireless device. The storage 112 may include read-only memory (ROM) or random access memory (RAM), electrically erasable programmable read-only memory (EEPROM), a flash memory device, or any memory device that can be used in processing systems and computing platforms. The processing circuit 102 may include and/or access a local database 114 that can maintain operational parameters and other information used to configure and operate the apparatus 100. The local database 114 may be implemented using one or more of a database module/circuit/processor or server, flash memory, magnetic media, EEPROM, optical media, tape, soft or hard disk, or the like. The processing circuit may also be operably coupled to external devices such as an antenna 122, a display 124, operator controls, such as a button 128 and a keypad 126, among other components.

Figure 2:
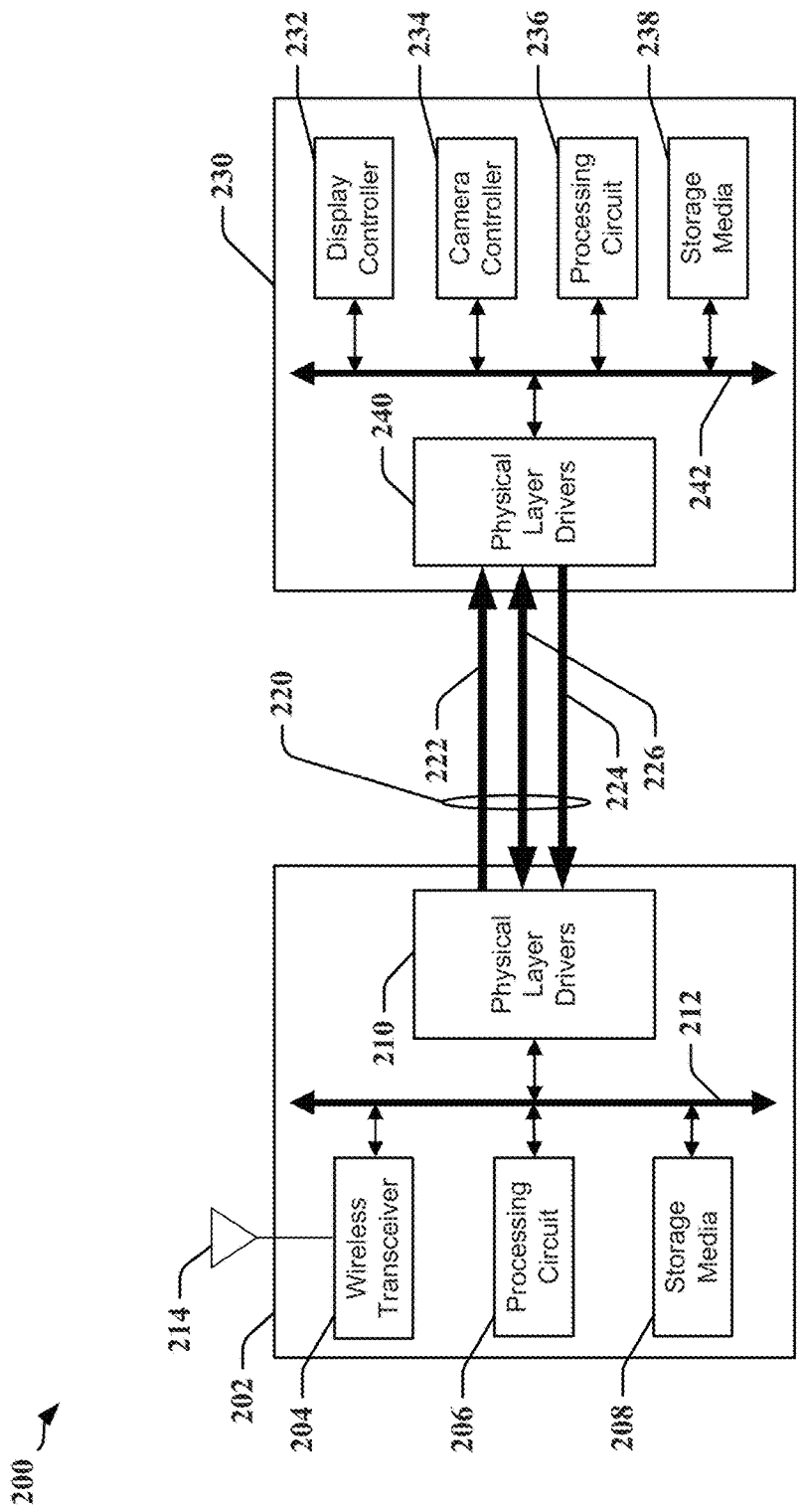
FIG. 2 illustrates a system architecture for an apparatus employing an N-phase polarity encoded data link.

FIG. 2 is a block schematic illustrating certain aspects of an apparatus 200 such as a wireless mobile device, a mobile telephone, a mobile computing system, a wireless telephone, a notebook computer, a tablet computing device, a media player, a gaming device, or the like. The apparatus 200 may include a plurality of IC devices 202 and 230 that exchange data and control information through a communications link 220. The communications link 220 may be used to connect the IC devices 202 and 230, which may be located in close proximity to one another or physically located in different parts of the apparatus 200. In one example, the communications link 220 may be provided on a chip carrier, substrate or circuit board that carries the IC devices 202 and 230. In another example, a first IC device 202 may be located in a keypad section of a flip-phone while a second IC device 230 may be located in a display section of the flip-phone. A portion of the communications link 220 may include a cable or an optical connection.

The communications link 220 may include multiple channels 222, 224 and 226. One or more channel 226 may be bidirectional, and may operate in half-duplex mode and/or full-duplex mode. One or more channels 222, 224 may be unidirectional. The communications link 220 may be asymmetrical, providing higher bandwidth in one direction. In one example described herein, a first communications channel 222 may be referred to as a forward link 222 while a second communications channel 224 may be referred to as a reverse link 224. The first IC device 202 may be designated as a host, master and/or transmitter, while the second IC device 230 may be designated as a client, slave and/or receiver, even if both IC devices 202 and 230 are configured to transmit and receive on the communications link 220. In one example, the forward link 222 may operate at a higher data rate when communicating data from a first IC device 202 to a second IC device 230, while the reverse link 224 may operate at a lower data rate when communicating data from the second IC device 230 to the first IC device 202.

The IC devices 202 and 230 may each include a processor or other processing and/or computing circuit or device 206, 236. In one example, the first IC device 202 may perform core functions of the apparatus 200, including maintaining wireless communications through a wireless transceiver 204 and an antenna 214, while the second IC device 230 may support a user interface that manages or operates a display controller 232, and may control operations of a camera or video input device using a camera controller 234. Other features supported by one or more of the IC devices 202 and 230 may include a keyboard, a voice-recognition component, and other input or output devices. The display controller 232 may include circuits and software drivers that support a display such as a liquid crystal display (LCD) panel, a touch-screen display, an indicator, and so on. The storage media 208 and 238 may include transitory and/or non-transitory storage devices adapted to maintain instructions and data used by the respective processing circuits 206 and 236, and/or other components of the IC devices 202 and 230. Communication between each processing circuit 206, 236 and its corresponding storage media 208 and 238 and other modules/processors and circuits may be facilitated by one or more buses 212 and 242, respectively.

The reverse link 224 may be operated in the same manner as the forward link 222. The forward link 222 and the reverse link 224 may be capable of transmitting at comparable speeds or at different speeds, where speed may be expressed as a data transfer rate and/or a clocking rate. The forward and reverse data rates may be substantially the same or may differ by orders of magnitude, depending on the application. In some applications a single bidirectional link 226 may support communications between the first IC device 202 and the second IC device 230. The forward link 222 and/or the reverse link 224 may be configurable to operate in a bidirectional mode when, for example, the forward and reverse links 222 and 224 share the same physical connections and operate in a half-duplex manner.

In certain examples, the reverse link 224 derives a clocking signal from the forward link 222 for synchronization purposes, for control purposes, to facilitate power management and/or for simplicity of design. The clocking signal may have a frequency that is obtained by dividing the frequency of a symbol clock used to transmit signals on the forward link 222. The symbol clock may be superimposed or otherwise encoded in symbols transmitted on the forward link 222. The use of a clocking signal that is a derivative of the symbol clock allows fast synchronization of transmitters and receivers (transceivers 210, 240) and enables fast start and stop of data signals without the need for framing to enable training and synchronization.

In certain examples, a single bidirectional link 226 may support communications between the first processing device (first IC device) 202 and the second processing device (second IC device) 230. In some instances, the first processing device 202 and the second processing device 230 provide encoding and decoding of data, address and control signals transmitted between a processing device and memory devices such as dynamic random access memory (DRAM). In one example, one or more of buses 212 and/or 242 may provide access to the DRAM using one of various encoding techniques.

Figure 3:
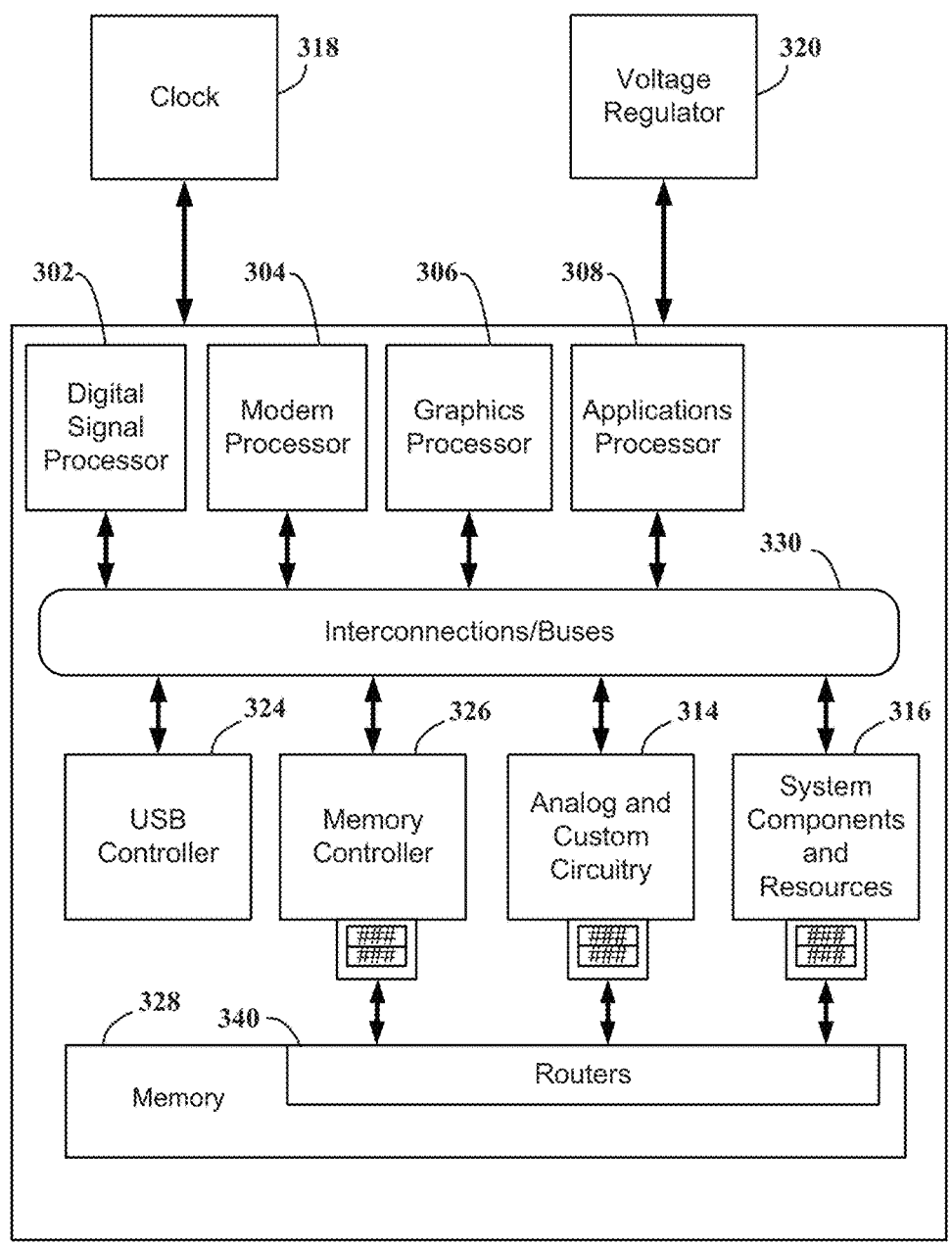
FIG. 3 is a block schematic illustrating certain aspects of an apparatus.

FIG. 3 illustrates example components and interconnections in a system-on-chip (SOC) 300 suitable for implementing various aspects of the disclosure. The SOC 300 may include a number of heterogeneous processors, such as a digital signal processor (DSP) 302, a modem processor 304, a graphics processor 306, and an application processor 308. Each processor 302, 304, 306, 308, may include one or more cores, and each processor/core may perform operations independent of the other processors/cores. The processors 302, 304, 306, 308 may be organized in close proximity to one another (e.g., on a single substrate, die, integrated chip, etc.) so that they may operate at a much higher frequency/clock-rate than would be possible if the signals were to travel off-chip. The proximity of the cores may also allow for the sharing of on-chip memory and resources (e.g., voltage rail), as well as for more coordinated cooperation between cores.

The SOC 300 may include analog circuitry and custom circuitry 314 for managing sensor data, analog-to-digital conversions, wireless data transmissions, and for performing other specialized operations (e.g., decoding high-definition video, video processing, etc.). The SOC 300 may further include various system components and resources 316, such as voltage regulators, oscillators, phase-locked loops, peripheral bridges, data controllers, system controllers, access ports, timers, and other similar components used to support the processors and software clients running on the computing device. The system components and resources 316 and custom circuitry 314 may also include circuitry for interfacing with peripheral devices, such as cameras, electronic displays, wireless communication devices, external memory chips, etc.

The SOC 300 may further include a universal serial bus (USB) controller 324, and one or more memory controllers 326. The SOC 300 may also include an input/output module/circuit/processor (not illustrated) for communicating with resources external to the SOC 300, such as a clock 318 and a voltage regulator 320, each of which may be shared by two or more of the internal SOC components.

The processors 302, 304, 306, 308 may be interconnected to the USB controller 324, the memory controller 326, system components and resources 316, custom circuitry 314, and other system components via an interconnection/bus module/circuit/processor 330, which may include an array of reconfigurable logic gates and/or implement a bus architecture. In an aspect, the interconnection/bus module/circuit/processor 330 may be equivalent to the bus 212 and/or bus 242 of FIG. 2. Communications may also be provided by advanced interconnects, such as high performance networks-on chip (NoCs).

The memory controller 326 may be a specialized hardware module/circuit/processor configured to manage the flow of data to and from memory 328. In an aspect, the memory controller 326 may include logic for interfacing with the memory 328, such as selecting a row and column corresponding to a memory location, reading or writing data to the memory location, etc.

In another aspect, routers 340 may be embedded within the memory 328. Via the custom circuitry 314, the system components and resources 316, and/or the memory controller 326, the routers 340 may manage concurrent access (data flow) between application interface circuits and memory locations (e.g., storage bank domains) of the memory 328. For example, the routers 340 allow for one application interface circuit of a first interface group to access one memory location of the memory 328 while a different application interface circuit of a second interface group accesses a different memory location of the memory 328. In an aspect, each of the routers 340 may be located adjacent to a corresponding set of memory locations. Accordingly, data having a low-latency requirement may be sent from an application interface circuit of an interface group to a memory location via a router 340 providing lowest-latency access to the memory location. Each of the routers 340 may include logic for interfacing with the memory 328, such as selecting a row and column corresponding to a memory location, reading or writing data to the memory location, etc.

Figure 4:
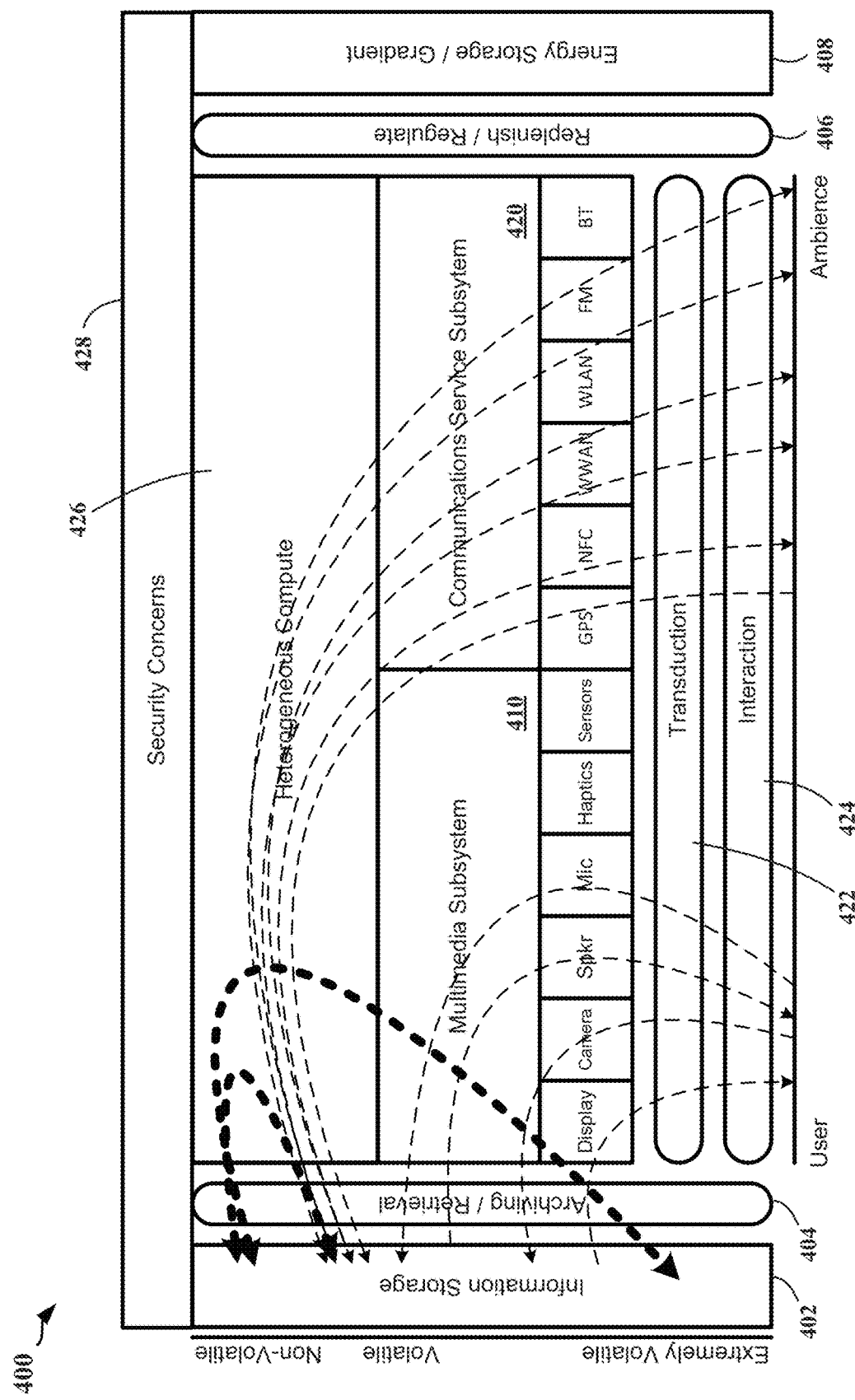
FIG. 4 is a diagram illustrating a functional organization of modules/circuits/processors within a device.

FIG. 4 is a diagram illustrating a functional organization of modules/circuits/processors within a device 400. The device 400 may include an information storage module/circuit/processor 402 configured to store information. The information storage module/circuit/processor 402 may, for example, be flash memory, DRAM, DDR memory, etc. The device 400 may also include a module/circuit/processor 404 configured to archive and/or retrieve information between the information storage module/circuit/processor 402 and other modules/circuits/processors of the device 400. The device 400 may also include modules/circuits/processors dedicated to power control/consumption, such as a replenish/regulate module/circuit/processor 406 and an energy storage/gradient module/circuit/processor 408. A multimedia subsystem module/circuit/processor 410 may operate with a number of different technology components, such as a display module/circuit/processor, a camera module/circuit/processor, a speaker module/circuit/processor, a microphone module/circuit/processor, a haptics module/circuit/processor, and a sensors module/circuit/processor. A communications service subsystem module/circuit/processor 420 may also operate with a number of different technology components, such as a GPS module/circuit/processor, a near-field communication (NFC) module/circuit/processor, a wireless wide area network (WWAN) module/circuit/processor, a wireless local area network (WLAN) module/circuit/processor, an FM module/circuit/processor, and a Bluetooth module/circuit/processor. Below the multimedia subsystem module/circuit/processor 410 and the communications service subsystem module/circuit/processor 420 may lie a transduction module/circuit/processor 422 and an interaction module/circuit/processor 424. Above the multimedia subsystem module/circuit/processor 410 and the communications service subsystem module/circuit/processor 420 may lie a heterogeneous compute module/circuit/processor 426 and a security concerns module/circuit/processor 428.

As shown in FIG. 4, multiple technology components (e.g., the display module/circuit/processor, the camera module/circuit/processor, the speaker module/circuit/processor, the microphone module/circuit/processor, the GPS module/circuit/processor, the NFC module/circuit/processor, the WWAN module/circuit/processor, the WLAN module/circuit/processor, and/or the FM module/circuit/processor) may need to access (denoted by dashed arrows) the common information storage module/circuit/processor 402 in order to store and/or retrieve data/code. However, previous systems allow for the different technology components to access the common information storage module/circuit/processor 402 at a high cost with a long delay. Accordingly, there is a need for a system that allows multiple technology components to concurrently access a common information storage at a reduced cost and a shorter delay.

Figure 5:
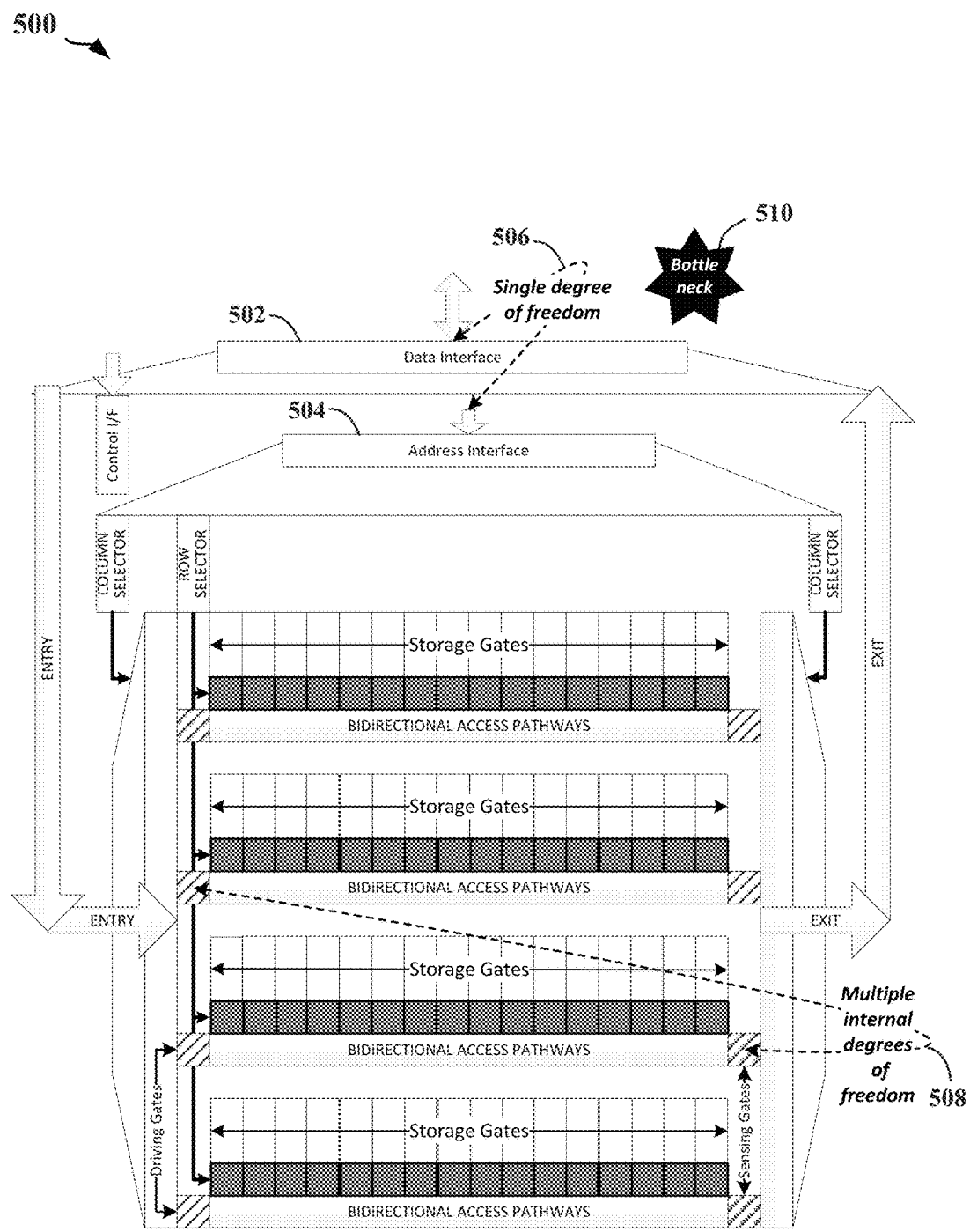
FIG. 5 is a diagram illustrating an organization of memory storage banks in a memory space.

FIG. 5 is a diagram illustrating an organization of memory storage banks (arrays) in a memory space 500. Storage banks may be accessed by different technology components through a common data interface 502 and a common address interface 504. As shown in FIG. 5, the common data interface 502 and the common address interface 504 may be used to access all storage banks.

In a parallel system, wherein multiple applications (e.g., multiple technology components) may wish to access the memory at the same time, a bottleneck 510 occurs due to a single interface (common data interface 502/address interface 504) being the only avenue available through which the multiple applications can access the memory (referred to as a "single degree of freedom" 506 in FIG. 5). Thus, an application must wait to access the memory if another application is already accessing the memory via the single interface. Within the memory, "several internal degrees of freedom" 508 are available in that different storage banks of the memory are capable of being accessed separately. However, even if different applications wish to use the different storage banks, respectively, the different applications are forced to go through the single interface to access the different storage banks. Hence, access is limited by the ability of the single interface to handle the multiple access attempts. To overcome the single interface bottleneck 510, a previous solution is to increase the processing speed of the single interface to accommodate for the multiple applications wanting to access the memory. However, the previous solution is problematic because the increase of processing speed comes at the cost of the single interface consuming more power.

Figure 6:
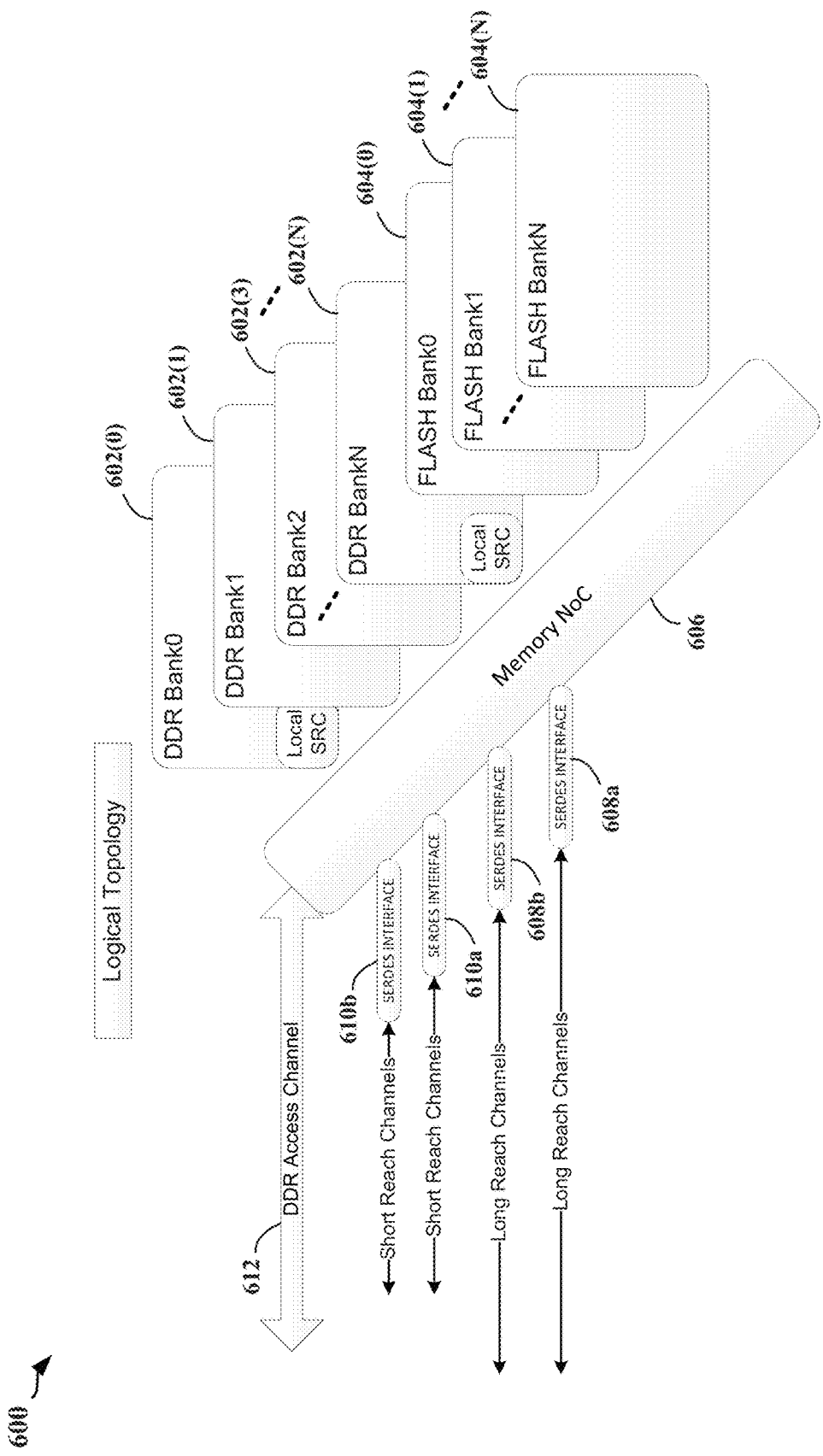
FIG. 6 is a diagram illustrating an example logical topology for organizing a memory according to the present disclosure.

To overcome the problems stated above, aspects of the present disclosure provide an alternative scheme for organizing the memory. FIG. 6 is a diagram 600 illustrating an example logical topology for organizing a memory according to the present disclosure. The memory may include a DDR memory including a DDR Bank0 602(0), a DDR Bank1 602(1), and a DDR Bank2 602(3) up to a DDR BankN 602(N). The memory may further include a FLASH memory including a FLASH Bank0 604(0) and a FLASH Bank1 604(1) up to a FLASH BankN 604(N). Communications to and from the memory banks may be provided by an advanced interconnect, such as a memory NoC 606. A number of interfaces, such as serializer/deserializer (SERDES) interfaces 608a, 608b, 610a, and 610b may operate with the memory NoC 606 to access one or more of the memory banks. In an example, an application may access one or more of the memory banks via a long reach channel using the SERDES interface 608a or 608b. In another example, application may access one or more of the memory banks via a short reach channel using the SERDES interface 610a or 610b. A DDR access channel 612 may also be provided to operate with the memory NoC 606 to access one or more of the memory banks.

Figure 7:
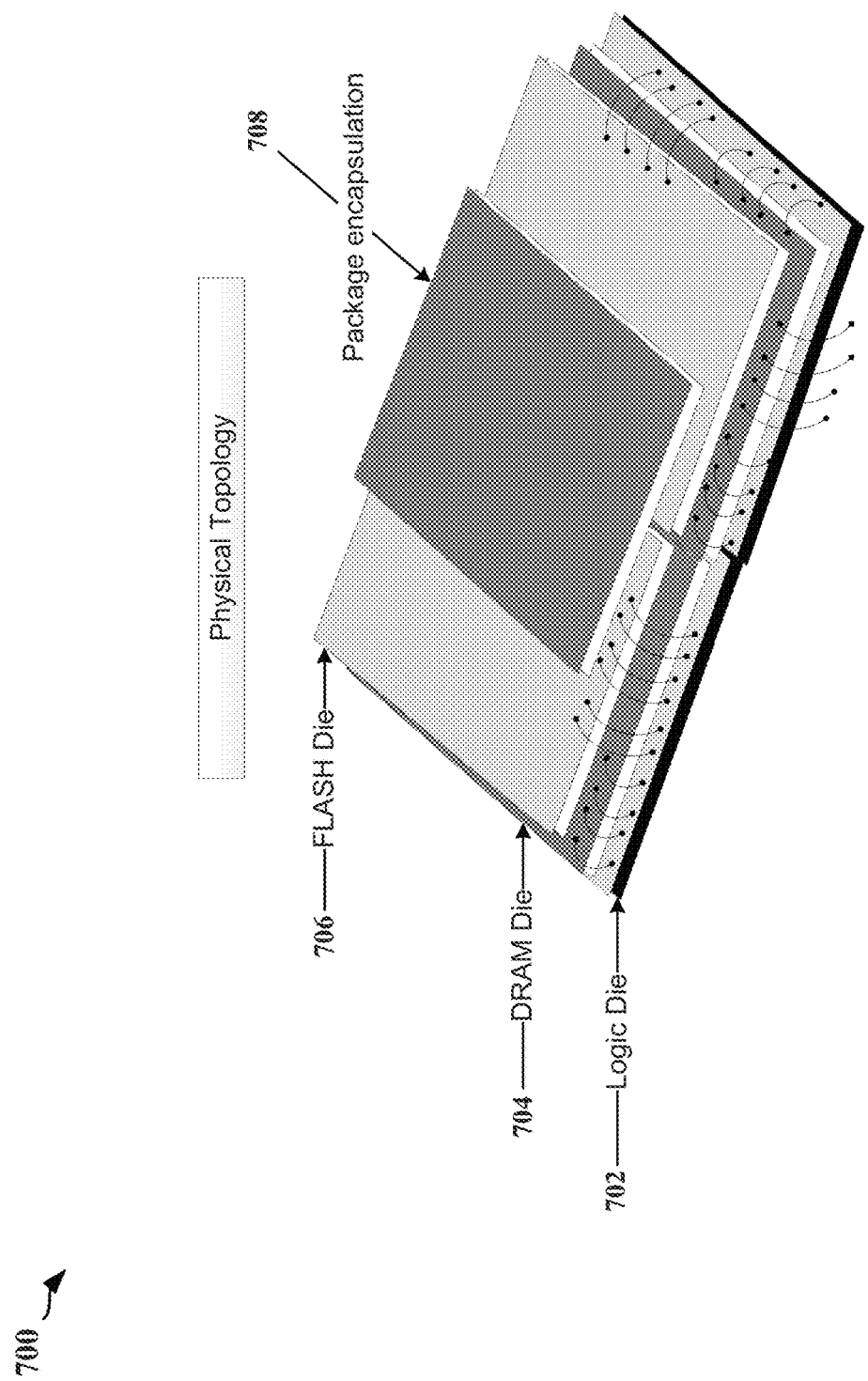
FIG. 7 is a diagram illustrating an example physical topology for organizing a memory according to the present disclosure.

FIG. 7 is a diagram 700 illustrating an example physical topology for organizing a memory according to the present disclosure. As shown in FIG. 7, a logic die 702 may lie at a lower end of the topology. A DRAM die 704 may be located above the logic die 702. A FLASH die 706 may be located above the DRAM die 704. Finally, a package encapsulation 708 may lie above the FLASH die 706.

Figure 8:
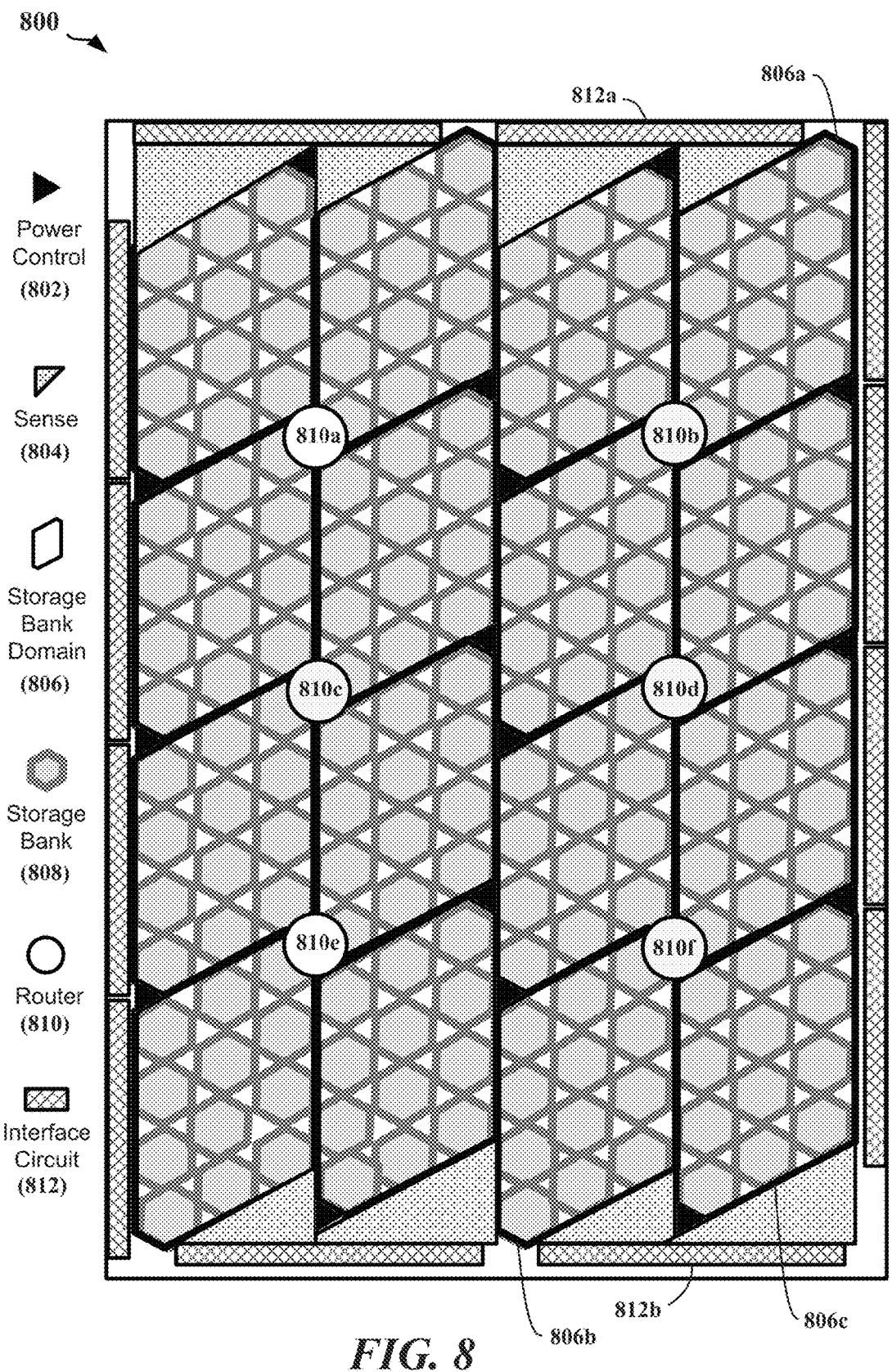
FIG. 8 is a diagram illustrating an organization of a memory space.
Figure 9:
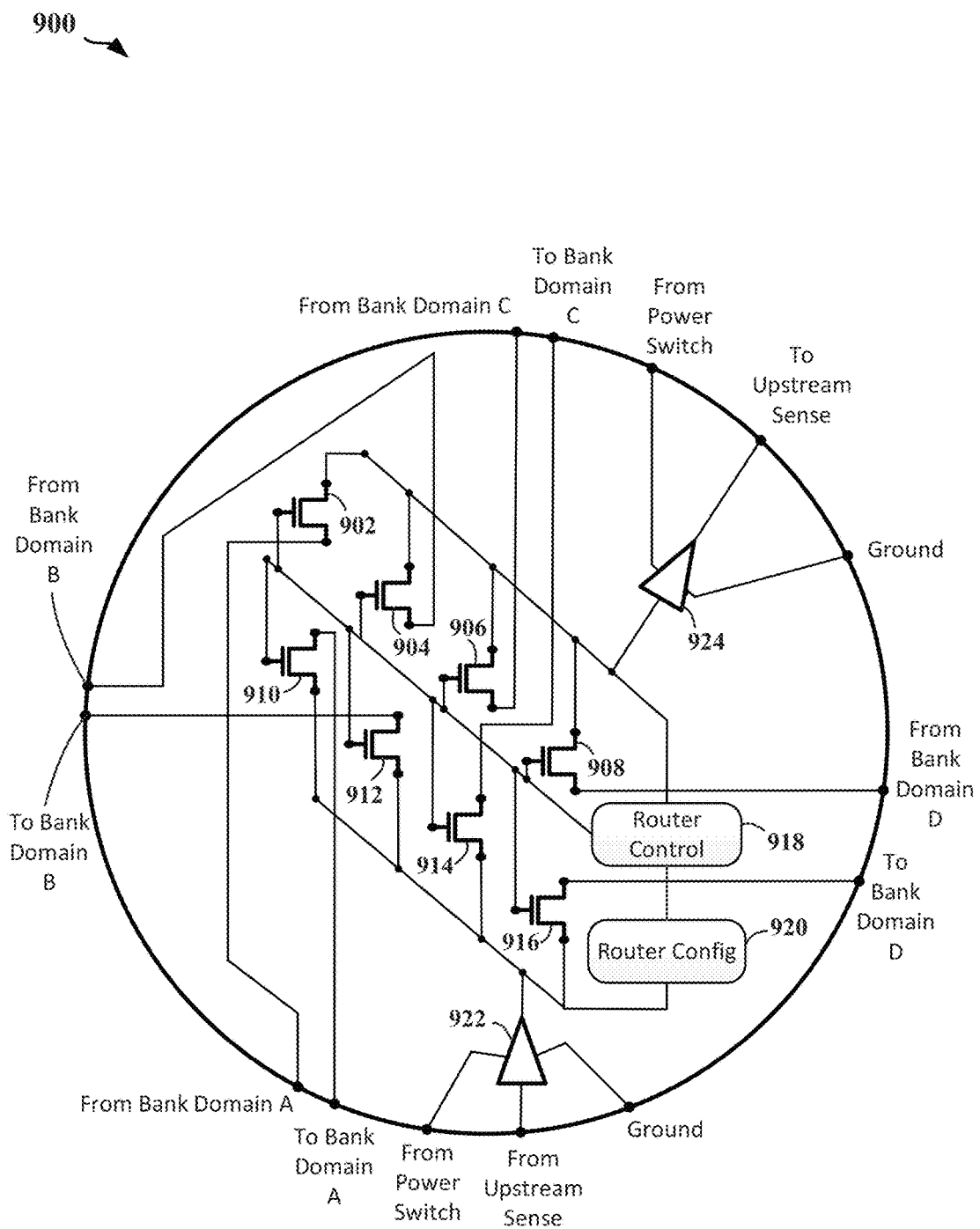
FIG. 9 is a diagram illustrating a router in accordance with aspects of the present disclosure.

FIG. 8 is a diagram illustrating an organization of a memory space 800. FIG. 9 is a diagram illustrating a router 900 in accordance with aspects of the present disclosure. The router 900 may include a number of transistors, for example, a first transistor 902, a second transistor 904, a third transistor 906, a fourth transistor 908, a fifth transistor 910, a sixth transistor 912, a seventh transistor 914, and an eighth transistor 916. The router 900 may further include a router control module/circuit/processor 918 coupled to a router configuration module/circuit/processor 920. The router control module/circuit/processor 918 may be configured to control operations of the router 900. The router configuration module/circuit/processor 920 may be configured to store configuration information related to the routing of data between a storage bank/storage bank domain and an application interface circuit. The router 900 may also include a first power control module/circuit/processor 922 and a second power control module/circuit/processor 924.

In an aspect, a gate of each of the transistors 902 to 916 is coupled to an output of the router control module/circuit/processor 918. A drain of each of the first transistor 902, the second transistor 904, the third transistor 906, and the fourth transistor 908 is coupled to an input of the router control module/circuit/processor 918 and an input of the second power control module/circuit/processor 924. An output of the second power control module/circuit/processor 924 is coupled to an upstream sense module/circuit/processor (e.g., sense module/circuit/processor 804 in FIG. 8). The second power control module/circuit/processor 924 is further coupled to a power switch and a ground node.

A source of each of the fifth transistor 910, the sixth transistor 912, the seventh transistor 914, and the eighth transistor 916 is coupled to an output of the router configuration module/circuit/processor 920 and an output of the first power control module/circuit/processor 922. An input of the first power control module/circuit/processor 922 is coupled to an upstream sense module/circuit/processor (e.g., sense module/circuit/processor 804). The first power control module/circuit/processor 922 is further coupled to a power switch and a ground node.

As an example, the router 900 may be configured to manage concurrent data flow between a number of application interface circuits (e.g., interface circuits 812) and four storage bank domains (e.g., four storage bank domains 806 in FIG. 8). Accordingly, each of the transistors 902 to 916 may be connected to storage banks of a particular storage bank domain to facilitate a data flow operation with such storage banks. For example, a source of the first transistor 902 is coupled to storage bank outputs of a first storage bank domain (bank domain A) and a drain of the fifth transistor 910 is coupled to storage bank inputs of the bank domain A; a source of the second transistor 904 is coupled to storage bank outputs of a second storage bank domain (bank domain B) and a drain of the sixth transistor 912 is coupled to storage bank inputs of the bank domain B; a source of the third transistor 906 is coupled to storage bank outputs of a third storage bank domain (bank domain C) and a drain of the seventh transistor 914 is coupled to storage bank inputs of the bank domain C; and a source of the fourth transistor 908 is coupled to storage bank outputs of a fourth storage bank domain (bank domain D) and a drain of the eighth transistor 916 is coupled to storage bank inputs of the bank domain D.

Figure 10:
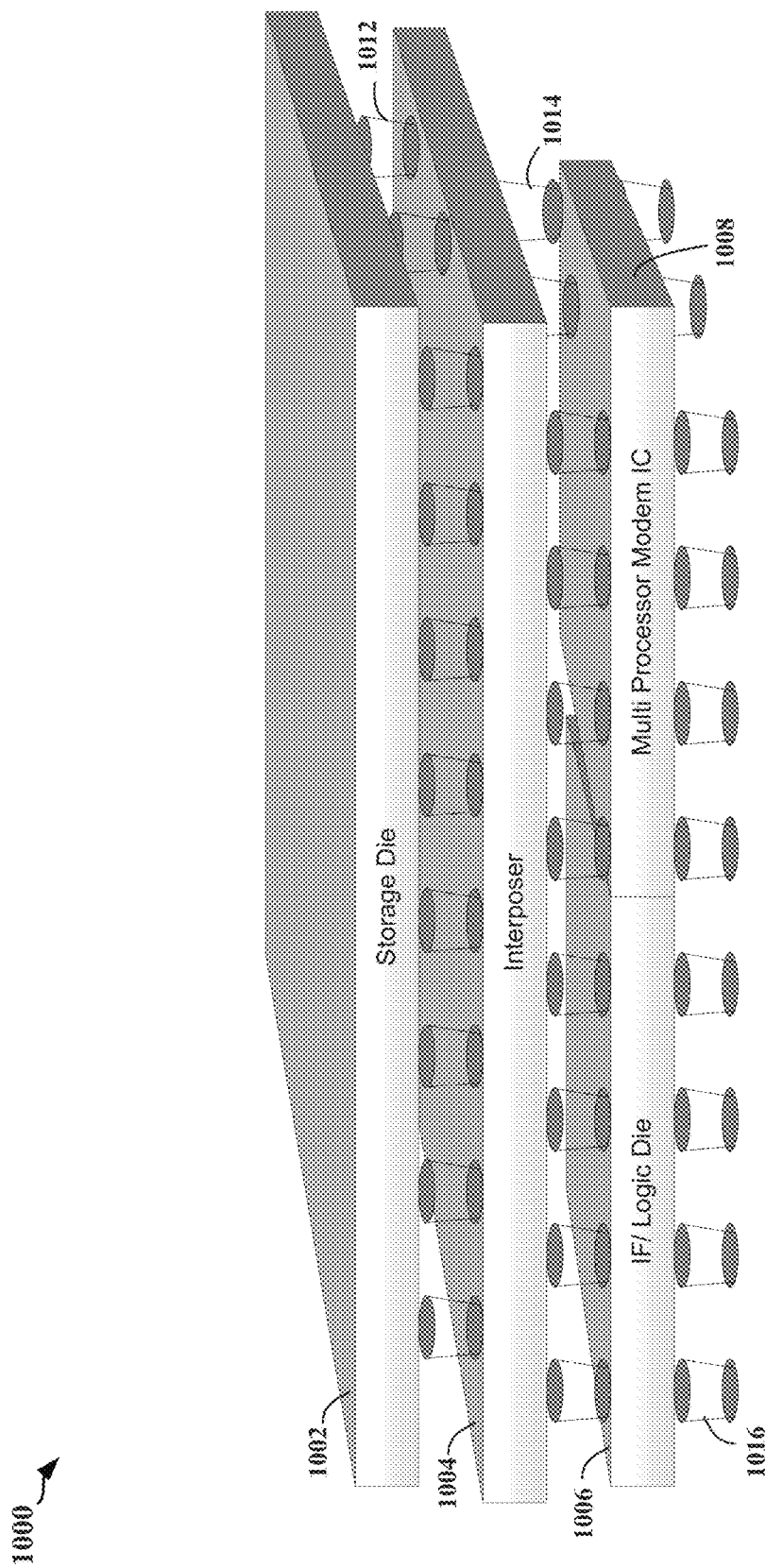
FIG. 10 is a diagram illustrating a physical topology for organizing a memory.

FIG. 10 is a diagram 1000 illustrating a physical topology for organizing a memory. As shown in FIG. 10, the topology includes a storage die 1002, an interposer 1004, an interface (IF)/logic die 1006, and a multi-processor modem IC 1008. The storage die 1002 is coupled to the interposer 1004 by a first set of interconnects 1012. The interposer 1004 is coupled to the IF/logic die 1006 and the multi-processor modem IC 1008 by a second set of interconnects 1014. A third set of interconnects 1016 may couple the IF/logic die 1006 and/or the multi-processor modem IC 1008 to other dies or a printed circuit board (PCB) (not shown).

Referring to FIGS. 6 to 10, the present disclosure provides for different applications (different technology components) to have individual interfaces for accessing the memory. The different applications accessing the memory may be on the same SOC on which the memory resides (on-chip), or on SOCs different from the SOC on which the memory resides (off-chip). Accordingly, the applications may access desired portions of the memory (storage bank) via their respective interfaces without having to wait for an application to complete an access attempt, such as in the single interface scheme described above.

Referring to FIG. 8, the memory space 800 provides an organization of power control modules/circuits/processors 802, sense modules/circuits/processors 804, memory storage bank domains 806, memory storage banks 808, and routers 810 that allows for a higher degree of freedom. Surrounding the memory space 800 are application interface circuits 812 representing the different applications accessing the memory storage banks 808.

As shown in FIG. 8, the storage banks 808 are grouped into storage bank domains (access domains) 806. Traditionally, each of the storage banks 808 may be identified/organized by row and column. The present disclosure now implements another layer of organization by grouping the storage banks 808 into the storage bank domains 806. A storage bank domain 806 provides a fast path to an exclusive memory area for accommodating different flows to/from the different application interface circuits 812. Each storage bank domain 806 is connected to a router 810 that allows fast access to the exclusive memory area. The routers 810 are embedded in the memory space 800 and allow for de-coupled operation for all the different flows to/from the different application interface circuits 812. Via the routers 810, the multiple interface circuits 812 are provided with a high degree of freedom, i.e., the interface circuits are provided with multiple avenues for accessing the desired memory storage banks 808 concurrently/simultaneously. Hence, additional buffering is prevented, such as in the single interface scheme described above.

In an aspect, the routers 810 are configurable elements which can be used to dynamically allocate each of the storage bank domains 806 to a given application interface circuit 812. The proximity of the application interface circuit 812 to the storage bank domain 806 may be determined by a number of router hops. The distance from the application interface circuit 812 to the storage bank domain 806 determines a total latency.

According to the scheme described with respect to FIG. 8, a small number of transactions from different application interface circuits 812 have overlapping or shared memory access. Largely, the memory storage banks 808 are more-or-less exclusive to individual application interface circuits 812. Accordingly, throughput may be increased, costs may be lowered, and overall power consumption may be reduced.

According to an aspect of the disclosure, referring again to FIG. 8, a memory space 800 within a memory device may be divided into a number of storage bank domains (access domains) 806. Moreover, application interface circuits 812 (representing different applications) intending to access the memory space 800 may be classified into a plurality of interface groups based on one or more application requirements. The one or more application requirements may include an application storage size requirement, an application interface bandwidth requirement, and/or an application interface latency requirement. Each interface group of the plurality of interface groups may be assigned to a corresponding storage bank domain 806.

A plurality of routers 810 (e.g., routers/micro-routers 810*a* through 810*f*) manage concurrent data flow between the plurality of interface groups and the storage bank domains. As such, the routers 810 provide access between each interface group and the corresponding storage bank domain 806. In particular, the routers 810 allow for one interface circuit (e.g. interface circuit 812*a*) of one interface group to access its corresponding storage bank domain (e.g., storage bank domain 806*a*) at the same time as (concurrently with) another interface circuit (e.g., interface circuit 812*b*) of another interface group accessing its own corresponding storage bank domain (e.g., storage bank domain 806*b*).

Each router of the plurality of routers 810 is located adjacent to a corresponding set of storage banks. The corresponding set of storage banks may include storage banks of different storage bank domains. For example, the router 810f is located adjacent to a set of storage banks that includes storage banks 808 from the storage bank domain 806b and the storage bank domain 806c. In an aspect, when data having a low-latency requirement is to be sent from an interface circuit of an interface group to a storage bank of a corresponding storage bank domain, the data may be sent via a router providing lowest-latency access to the storage bank. For example, when data from the interface circuit 812a having a low-latency requirement is to be sent to a storage bank within the storage bank domain 806c, the data may be sent via the router 810, which provides the lowest latency access to the storage bank.

In a further aspect, the storage bank domains 806 are separately power-controlled via power control module/circuit/processor 802. This allows for dynamically optimizing each of the storage bank domains 806 separately according to usage requirements of an interface group corresponding to a particular storage bank domain.

In an aspect, the interface circuits 812 may be grouped, determine an assigned storage bank domain(s), and learn of which router(s) to access the storage bank domain(s) via a system configuration message. When the application interface circuit 812 sends information/data to a router 810 for storing in a particular storage bank 808, the application interface circuit 812 includes an address bit/token in the information/data. The address bit/token may identify the particular storage bank domain 806 and/or the particular storage bank 808 the application interface circuit 812 wishes to access. Once the information/data is received by the router 810, the router 810 may determine via the address bit/token in which storage bank 808 to store the information/data. If the address bit/token belongs to a storage bank 808 managed by the router 810, the router 810 will store the information/data in the appropriate storage bank 808. If the address bit/token does not belong to a storage bank managed by the router 810, the router 10 will forward the information/data to an appropriate router for further handling.

In an aspect, the application interface circuits 812 may be configured such that storage bank addresses most frequently used by the application interface circuits may be accessed using one router hop. Storage bank addresses less frequently used by the application interface circuits may be accessed using multiple router hops.

Figure 11:
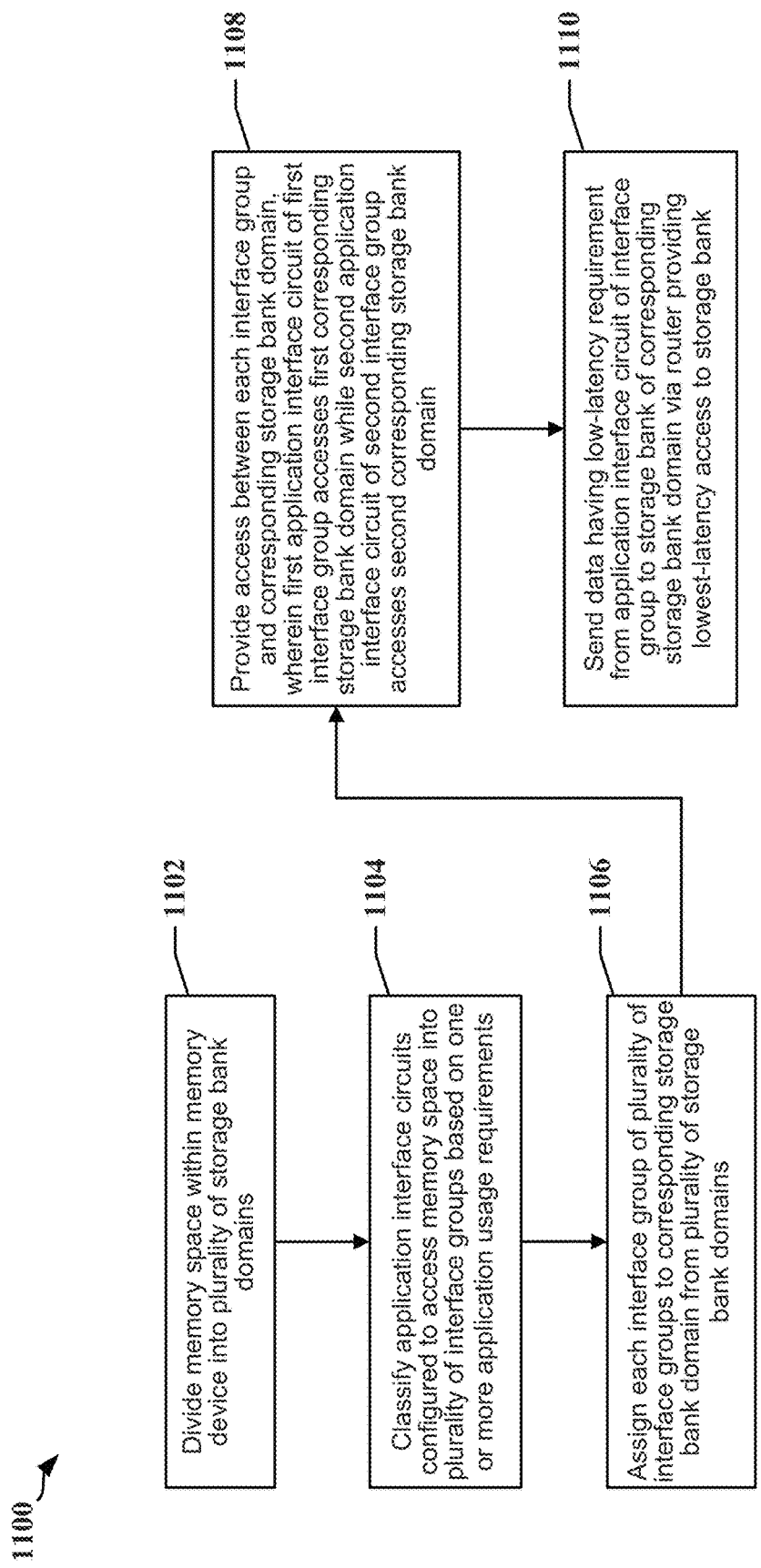
FIG. 11 is a flowchart illustrating a method of accessing a memory device.

FIG. 11 is a flowchart illustrating a method of accessing a memory device (e.g. memory 328 or memory space 800). The method may be performed by an apparatus (e.g., apparatus 100 or SOC 300).

At 1102, the apparatus may divide a memory space within the memory device into a plurality of storage bank domains. In an aspect, the apparatus may separately power-control the storage bank domains.

At 1104, the apparatus may classify application interface circuits (e.g., interface circuits 812) configured to access the memory space into a plurality of interface groups based on one or more application usage requirements. The one or more application usage requirements may include an application storage size requirement, an application interface bandwidth requirement, or an application interface latency requirement.

At 1106, the apparatus may assign each interface group of the plurality of interface groups to a corresponding storage bank domain from the plurality of storage bank domains.

At 1108, the apparatus may provide access between each interface group and the corresponding storage bank domain. In an aspect, a first application interface circuit of a first interface group accesses a first corresponding storage bank domain while a second application interface circuit of a second interface group accesses a second corresponding storage bank domain. The access may be provided by a plurality of routers (e.g., routers 340, routers 810, or router 900) managing concurrent data flow between the plurality of interface groups and the storage bank domains. The plurality of routers may be located between the application interface circuits and the plurality of storage bank domains.

In an aspect, each router of the plurality of routers is located adjacent to a corresponding set of storage banks, wherein the corresponding set of storage banks includes storage banks of different storage bank domains. Accordingly, at 1110, the apparatus may send data having a low-latency requirement from an application interface circuit of an interface group to a storage bank of a corresponding storage bank domain via a router providing lowest-latency access to the storage bank.

Figure 12:
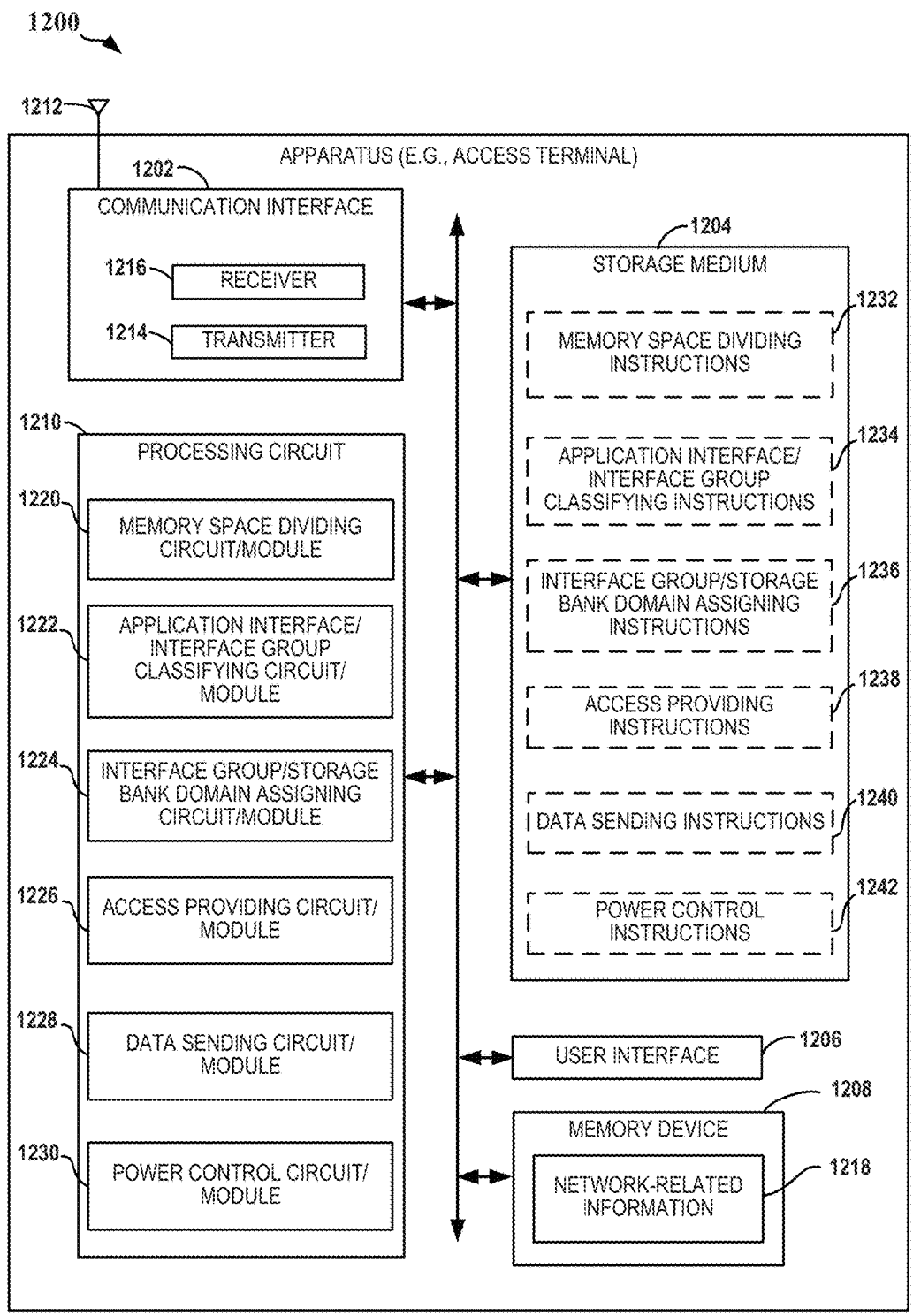
FIG. 12 is an illustration of an apparatus configured to support operations related to accessing a memory device according to one or more aspects of the disclosure.

FIG. 12 is an illustration of an apparatus 1200 configured to support operations related to accessing a memory device according to one or more aspects of the disclosure (e.g., aspects related to the method of FIG. 11 described above). The apparatus 1200 includes a communication interface (e.g., at least one transceiver) 1202, a storage medium 1204, a user interface 1206, a memory device 1208, and a processing circuit 1210.

These components can be coupled to and/or placed in electrical communication with one another via a signaling bus or other suitable component, represented generally by the connection lines in FIG. 12. The signaling bus may include any number of interconnecting buses and bridges depending on the specific application of the processing circuit 1210 and the overall design constraints. The signaling bus links together various circuits such that each of the communication interface 1202, the storage medium 1204, the user interface 1206, and the memory device 1208 are coupled to and/or in electrical communication with the processing circuit 1210. The signaling bus may also link various other circuits (not shown) such as timing sources, peripherals, voltage regulators, and power management circuits, which are well known in the art, and therefore, will not be described any further.

The communication interface 1202 may be adapted to facilitate wireless communication of the apparatus 1200. For example, the communication interface 1202 may include circuitry and/or code (e.g., instructions) adapted to facilitate the communication of information bi-directionally with respect to one or more communication devices in a network. The communication interface 1202 may be coupled to one or more antennas 1212 for wireless communication within a wireless communication system. The communication interface 1202 can be configured with one or more standalone receivers and/or transmitters, as well as one or more transceivers. In the illustrated example, the communication interface 1202 includes a transmitter 1214 and a receiver 1216.

The memory device 1208 may represent one or more memory devices. As indicated, the memory device 1208 may maintain network-related information 1218 along with other information used by the apparatus 1200. In some implementations, the memory device 1208 and the storage medium 1204 are implemented as a common memory component. The memory device 1208 may also be used for storing data that is manipulated by the processing circuit 1210 or some other component of the apparatus 1200.

The storage medium 1204 may represent one or more computer-readable, machine-readable, and/or processor-readable devices for storing code, such as processor executable code or instructions (e.g., software, firmware), electronic data, databases, or other digital information. The storage medium 1204 may also be used for storing data that is manipulated by the processing circuit 1210 when executing code. The storage medium 1204 may be any available media that can be accessed by a general purpose or special purpose processor, including portable or fixed storage devices, optical storage devices, and various other mediums capable of storing, containing or carrying code.

By way of example and not limitation, the storage medium 1204 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read-only memory (ROM), a programmable ROM (PROM), an erasable PROM (EPROM), an electrically erasable PROM (EEPROM), a register, a removable disk, and any other suitable medium for storing code that may be accessed and read by a computer. The storage medium 1104 may be embodied in an article of manufacture (e.g., a computer program product). By way of example, a computer program product may include a computer-readable medium in packaging materials. In view of the above, in some implementations, the storage medium 1204 may be a non-transitory (e.g., tangible) storage medium.

The storage medium 1204 may be coupled to the processing circuit 1210 such that the processing circuit 1210 can read information from, and write information to, the storage medium 1204. That is, the storage medium 1204 can be coupled to the processing circuit 1210 so that the storage medium 1204 is at least accessible by the processing circuit 1210, including examples where at least one storage medium is integral to the processing circuit 1210 and/or examples where at least one storage medium is separate from the processing circuit 1210 (e.g., resident in the apparatus 1200, external to the apparatus 1200, distributed across multiple entities, etc.).

Code and/or instructions stored by the storage medium 1204, when executed by the processing circuit 1210, causes the processing circuit 1210 to perform one or more of the various functions and/or process operations described herein. For example, the storage medium 1204 may include operations configured for regulating operations at one or more hardware blocks of the processing circuit 1210, as well as to utilize the communication interface 1202 for wireless communication utilizing their respective communication protocols.

The processing circuit 1210 is generally adapted for processing, including the execution of such code/instructions stored on the storage medium 1204. As used herein, the term "code" or "instructions" shall be construed broadly to include without limitation programming, instructions, instruction sets, data, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 1210 is arranged to obtain, process and/or send data, control data access and storage, issue commands, and control other desired operations. The processing circuit 1210 may include circuitry configured to implement desired code provided by appropriate media in at least one example. For example, the processing circuit 1210 may be implemented as one or more processors, one or more controllers, and/or other structure configured to execute executable code. Examples of the processing circuit 1210 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 1210 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 1210 are for illustration and other suitable configurations within the scope of the disclosure are also contemplated.

According to one or more aspects of the disclosure, the processing circuit 1210 may be adapted to perform any or all of the features, processes, functions, operations and/or routines for any or all of the apparatuses described herein. As used herein, the term "adapted" in relation to the processing circuit 1210 may refer to the processing circuit 1210 being one or more of configured, employed, implemented, and/or programmed to perform a particular process, function, operation and/or routine according to various features described herein.

According to at least one example of the apparatus 1200, the processing circuit 1210 may include one or more of a memory space dividing circuit/module 1220, an application interface/interface group classifying circuit/module 1222, an interface group/storage bank domain assigning circuit/module 1224, an access providing circuit/module 1226, a data sending circuit/module 1228, and a power control circuit/module 1230.

The memory space dividing circuit/module 1220 may include circuitry and/or instructions (e.g., memory space dividing instructions 1232 stored on the storage medium 1204) adapted to perform several functions relating to, for example, dividing a memory space within a memory device 1208 into a plurality of storage bank domains.

The application interface/interface group classifying circuit/module 1222 may include circuitry and/or instructions (e.g., application interface/interface group classifying instructions 1234 stored on the storage medium 1204) adapted to perform several functions relating to, for example, classifying application interface circuits configured to access the memory space into a plurality of interface groups based on one or more application usage requirements. The one or more application usage requirements may include an application storage size requirement, an application interface bandwidth requirement, and/or an application interface latency requirement.

The interface group/storage bank domain assigning circuit/module 1224 may include circuitry and/or instructions (e.g., interface group/storage bank domain assigning instructions 1236 stored on the storage medium 1204) adapted to perform several functions relating to, for example, assigning each interface group of the plurality of interface groups to a corresponding storage bank domain from the plurality of storage bank domains.

The access providing circuit/module 1226 may include circuitry and/or instructions (e.g., access providing instructions 1238 stored on the storage medium 1204) adapted to perform several functions relating to, for example, providing access between each interface group and the corresponding storage bank domain, wherein a first application interface circuit of a first interface group accesses a first corresponding storage bank domain while a second application interface circuit of a second interface group accesses a second corresponding storage bank domain. The access providing circuit/module 1226 may provide the access via a plurality of routers managing concurrent data flow between the plurality of interface groups and the storage bank domains, wherein the plurality of routers are located between the application interface circuits and the plurality of storage banks.

The data sending circuit/module 1228 may include circuitry and/or instructions (e.g., data sending instructions 1240 stored on the storage medium 1204) adapted to perform several functions relating to, for example, sending data having a low-latency requirement from an application interface circuit of an interface group to a storage bank of a corresponding storage bank domain via a router providing lowest-latency access to the storage bank.

The power control circuit/module 1230 may include circuitry and/or instructions (e.g., power control instructions 1242 stored on the storage medium 1204) adapted to perform several functions relating to, for example, separately power-controlling the storage bank domains.

As mentioned above, instructions stored by the storage medium 1204, when executed by the processing circuit 1210, causes the processing circuit 1210 to perform one or more of the various functions and/or process operations described herein. For example, the storage medium 1204 may include one or more of the memory space dividing instructions 1232, the application interface/interface group classifying instructions 1234, the interface group/storage bank domain assigning instructions 1236, the access providing instructions 1238, the data sending instructions 1240, and the power control instructions 1242.

It is understood that the specific order or hierarchy of steps in the processes disclosed is an illustration of exemplary approaches. The specific order or hierarchy of steps in the processes may be rearranged based upon design preferences. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of accessing a memory device, comprising:
   dividing a memory space within the memory device into a plurality of storage bank domains;
   classifying application interface circuits configured to access the memory space into a plurality of interface groups based on one or more application usage requirements;
   assigning each interface group of the plurality of interface groups to a corresponding storage bank domain from the plurality of storage bank domains; and
   providing access between each interface group and the corresponding storage bank domain, wherein a first application interface circuit of a first interface group accesses a storage bank of a first corresponding storage bank domain while a second application interface circuit of a second interface group accesses a storage bank of a second corresponding storage bank domain.

2. The method of claim 1, wherein the one or more application usage requirements includes at least one of:
   an application storage size requirement;
   an application interface bandwidth requirement; or
   an application interface latency requirement.

3. The method of claim 1, wherein the access is provided by a plurality of routers managing concurrent data flow between the plurality of interface groups and the plurality of storage bank domains, wherein the plurality of routers are located between the application interface circuits and the plurality of storage bank domains.

4. The method of claim 3, wherein each router of the plurality of routers is located adjacent to a corresponding set of storage banks, the corresponding set of storage banks including storage banks of different storage bank domains.

5. The method of claim 4, further including sending data having a low-latency requirement from an application interface circuit of an interface group to a storage bank of a corresponding storage bank domain via a router providing lowest-latency access to the storage bank.

6. The method of claim 1, further including separately power-controlling the plurality of storage bank domains.

7. An apparatus for accessing a memory device, comprising:
   means for dividing a memory space within the memory device into a plurality of storage bank domains;
   means for classifying application interface circuits configured to access the memory space into a plurality of interface groups based on one or more application usage requirements;
   means for assigning each interface group of the plurality of interface groups to a corresponding storage bank domain from the plurality of storage bank domains; and
   means for providing access between each interface group and the corresponding storage bank domain, wherein a first application interface circuit of a first interface group accesses a first corresponding storage bank domain while a second application interface circuit of a second interface group accesses a second corresponding storage bank domain.

8. The apparatus of claim 7, wherein the one or more application usage requirements includes at least one of:
   an application storage size requirement;
   an application interface bandwidth requirement; or
   an application interface latency requirement.

9. The apparatus of claim 7, wherein the means for providing access includes a plurality of routers managing concurrent data flow between the plurality of interface groups and the plurality of storage bank domains, wherein the plurality of routers are located between the application interface circuits and the plurality of storage bank domains.

10. The apparatus of claim 9, wherein each router of the plurality of routers is located adjacent to a corresponding set of storage banks, the corresponding set of storage banks including storage banks of different storage bank domains.

11. The apparatus of claim 10, further including means for sending data having a low-latency requirement from an application interface circuit of an interface group to a storage bank of a corresponding storage bank domain via a router providing lowest-latency access to the storage bank.

12. The apparatus of claim 7, further including means for separately power-controlling the plurality of storage bank domains.

13. An apparatus for accessing a memory device, comprising:
at least one processing circuit configured to:
divide a memory space within the memory device into a plurality of storage bank domains;
classify application interface circuits configured to access the memory space into a plurality of interface groups based on one or more application usage requirements;
assign each interface group of the plurality of interface groups to a corresponding storage bank domain from the plurality of storage bank domains; and
provide access between each interface group and the corresponding storage bank domain, wherein a first application interface circuit of a first interface group accesses a first corresponding storage bank domain while a second application interface circuit of a second interface group accesses a second corresponding storage bank domain.

14. The apparatus of claim 13, wherein the one or more application usage requirements includes at least one of:
an application storage size requirement;
an application interface bandwidth requirement; or
an application interface latency requirement.

15. The apparatus of claim 13, wherein the at least one processing circuit is configured to provide the access via a plurality of routers managing concurrent data flow between the plurality of interface groups and the plurality of storage bank domains, wherein the plurality of routers are located between the application interface circuits and the plurality of storage bank domains.

16. The apparatus of claim 15, wherein each router of the plurality of routers is located adjacent to a corresponding set of storage banks, the corresponding set of storage banks including storage banks of different storage bank domains.

17. The apparatus of claim 16, wherein the at least one processing circuit is further configured to send data having a low-latency requirement from an application interface circuit of an interface group to a storage bank of a corresponding storage bank domain via a router providing lowest-latency access to the storage bank.

18. The apparatus of claim 13, wherein the at least one processing circuit is further configured to separately power-control the plurality of storage bank domains.

19. A non-transitory processor-readable storage medium having one or more instructions which, when executed by at least one processing circuit, cause the at least one processing circuit to:
divide a memory space within a memory device into a plurality of storage bank domains;
classify application interface circuits configured to access the memory space into a plurality of interface groups based on one or more application usage requirements;
assign each interface group of the plurality of interface groups to a corresponding storage bank domain from the plurality of storage bank domains; and
provide access between each interface group and the corresponding storage bank domain, wherein a first application interface circuit of a first interface group accesses a first corresponding storage bank domain while a second application interface circuit of a second interface group accesses a second corresponding storage bank domain.

20. The non-transitory processor-readable storage medium of claim 19, wherein the one or more application usage requirements includes at least one of:
an application storage size requirement;
an application interface bandwidth requirement; or
an application interface latency requirement.

21. The non-transitory processor-readable storage medium of claim 19, wherein the access is provided by a plurality of routers managing concurrent data flow between the plurality of interface groups and the plurality of storage bank domains, wherein the plurality of routers are located between the application interface circuits and the plurality of storage bank domains.

22. The non-transitory processor-readable storage medium of claim 21, wherein each router of the plurality of routers is located adjacent to a corresponding set of storage banks, the corresponding set of storage banks including storage banks of different storage bank domains.

23. The non-transitory processor-readable storage medium of claim 22, wherein the one or more instructions which, when executed by the at least one processing circuit, further cause the at least one processing circuit to send data having a low-latency requirement from an application interface circuit of an interface group to a storage bank of a corresponding storage bank domain via a router providing lowest-latency access to the storage bank.

24. The non-transitory processor-readable storage medium of claim 19, wherein the one or more instructions which, when executed by the at least one processing circuit, further cause the at least one processing circuit to separately power-control the plurality of storage bank domains.

* * * * *